3 Sheets—Sheet 1.

G. HAWKES,

Assignor to THE HAWKES LASTING MACHING COMPANY.

LASTING MACHINE.

No. 10,499.

Reissued July 22, 1884.

Witnesses.

J. H. Adams

E. Blanta

Inventor.

Gilbert Hawkes.

G. HAWKES,

Assignor to THE HAWKES LASTING MACHING COMPANY.

LASTING MACHINE.

No. 10,499. Reissued July 22, 1884.

Witnesses.

J. H. Adams

E. Blanta

Inventor.

Gilbert Hawkes.

G. HAWKES,

Assignor to THE HAWKES LASTING MACHING COMPANY.

LASTING MACHINE.

No. 10,499. Reissued July 22, 1884.

Witnesses.
J. H. Adams
C. Blantra

Inventor.
Gilbert Hawkes.

UNITED STATES PATENT OFFICE.

GILBERT HAWKES, OF LYNN, MASSACHUSETTS, ASSIGNOR TO THE HAWKES LASTING MACHINE COMPANY, OF MAINE.

LASTING-MACHINE.

SPECIFICATION forming part of Reissued Letters Patent No. 10,499, dated July 22, 1884.

Original No. 232,964, dated October 5, 1880. Application for reissue filed May 29, 1882.

*To all whom it may concern:*

Be it known that I, GILBERT HAWKES, of Lynn, in the county of Essex and State of Massachusetts, have invented certain new and useful Improvements in Machines for Lasting Boots and Shoes, of which the following is a specification.

My invention consists in devices whereby the upper of a boot or shoe being placed upon a last is lasted—*i. e.*, drawn by suitable mechanism into its proper position and there made secure or fastened, so as to be ready to receive the outer sole.

I will now proceed to describe my improvements as embodied in a machine and illustrated in the following drawings, in which—

Figure 1:
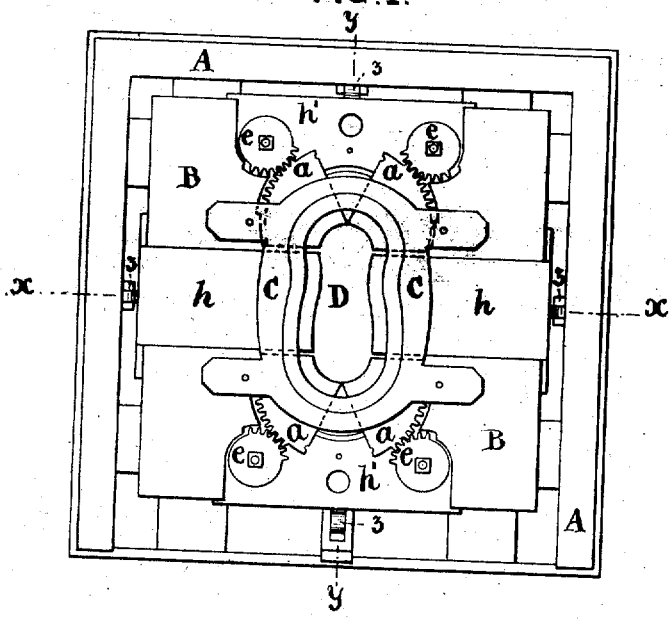
Figure 1A:
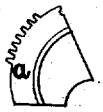
Figure 2:
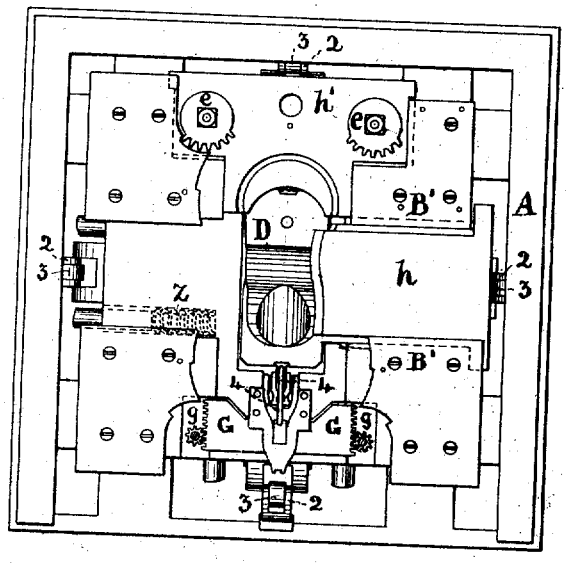
Figure 3:
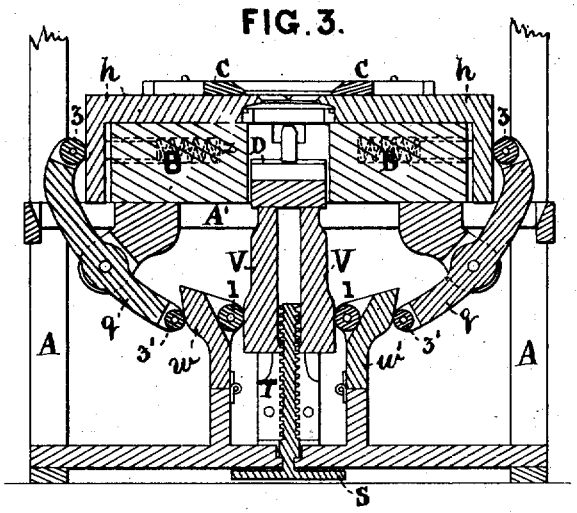
Figure 4:
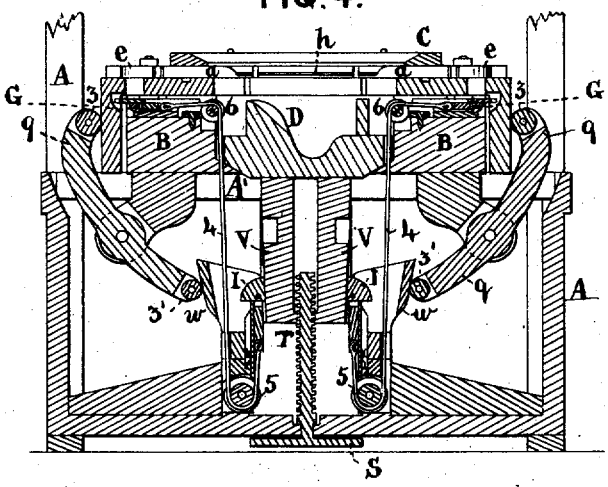
Figure 5:
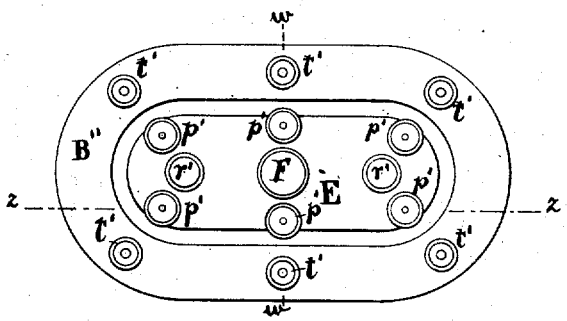
Figure 6:
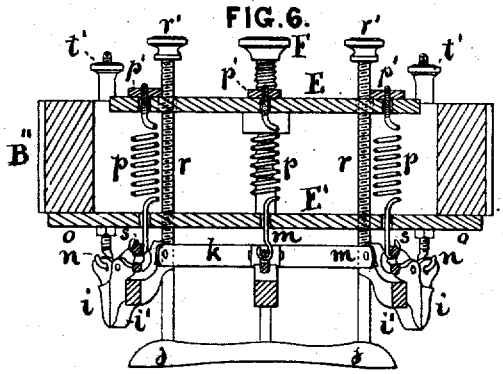
Figure 7:
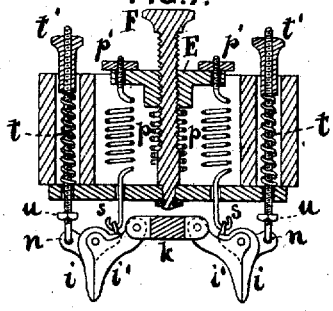
Figure 8:
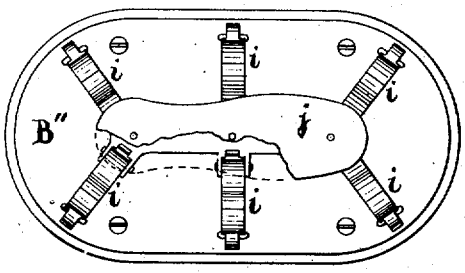

Figure 1 represents a plan view of my machine, the gripping attachment having been removed. Fig. 1ª represents the under side of one of the heel and toe lasting devices. Fig. 2 represents a plan view similar to Fig. 1, except that one of the slides is removed, with the parts immediately connected with it, to show the parts beneath. Fig. 3 is a vertical section on the line *x x* of Fig. 1. Fig. 4 is a vertical section on the line *y y* of Fig. 1. Fig. 5 is a plan view of the gripping device. Fig. 6 is a longitudinal vertical section on the line *z z* of Fig. 5. Fig. 7 is a transverse vertical section on the line *w w* of Fig. 5. Fig. 8 is a bottom view of the auxiliary gripping device.

The machine, as a whole, includes, first, mechanism for carrying the last; second, mechanism for stretching or drawing the upper vertically above the edge of the last; third, mechanism for stretching or forcing the upper laterally over and beyond the edge of the last, and, fourth, mechanism for temporarily securing the stretched upper in position, where it may be permanently secured by nails, pegs, cement, or other practicable means.

My machine is constructed with a rectangular frame, A, of suitable material, consisting of four uprights at the corners and stayed by proper cross-pieces, A′, at the bottom, top, and middle. Within this frame, resting upon the stays placed in the middle by suitable supports, is a second frame, B. This is partially covered, but so as to leave an open space for the reception of the heel, toe, and side pieces. Resting upon this second frame by suitable supports, B′, securely fastened to it, is a frame, C, of the shape of the sole of a boot or shoe, but somewhat larger. The upper having been put onto the last, the latter is passed into the machine, through and beyond the frame or yoke C, to a support, D, on which the last is supported while the lasting is performed. This support is set in a well in the middle of the second frame, B, and rests upon shoulders or projections from the frame B, (see Fig. 4,) by which it is supported, and it is capable of vertical motion within the well.

For the more effectual vertical drawing or stretching of the upper beyond the last, I arrange a device co-operative with and auxiliary to the other devices in the machine, later described. This device, which is so constructed as to be readily detached from the machine, and which is also made capable of being brought up to or removed from its place of working while still remaining on the machine, is now thrown over upon the hinge, by which it is connected with the machine, and thus brought into place over the last.

The mechanism shown in detail at Figs. 5, 6, 7, and 8 consists of a series of pinchers arranged around the edge and on the lower surface of a frame, B″, of the shape shown in the drawings. The inner jaw, *i′*, of the several pinchers is attached to an elongated piece of metal or bar, *k*, attached to screw-rods *r′* passing through the under side of the frame B″, and these several jaws turn freely on pivots, which connect them with this elongated piece of metal. The other or outside jaw, *i*, of each pincher is connected with a rod, *t′*, which runs through to the upper side of the frame, and can be drawn down when desired, as will be explained. Upon the under side of each of these rods is a nut, *u*, and around each rod, inside of the frame, is a coiled spring, *t*, which is compressed by means of a head fastened to the rod. The object of these heads and nuts is to give greater or less rigidity to the springs *t*, as required. There is also a lug or ear, *s*, on the inner ends of the outer jaws of the several pinchers, to which is attached a spring, *p*, the upper end of which forms a rod, *p′*, running through a metal plate, E, placed inside of the frame B″. On the end of these spring-rods, which is outside of this plate E, is a nut, as shown. By means of the springs *p t* and rods *p′ t′* the grip of each pincher on its part of the upper is regulated at pleasure, while each pincher still remains capable of being swung in around its pivoted connection with the elongated piece of metal or bar *k*.

Through the elongated piece of metal or bar *k*, above mentioned, and near each of its extremities, runs a rod, *r*, connected at one end to a second piece of metal, *j*, of the shape of the sole of a shoe, called a "downhold." The rod *r* is screw-threaded, and the interior of the elongated piece screw-threaded to match. These rods pass through apertures in the plate E′, screw-threaded to correspond with them, and extend to and through the upper side of the plate E, above referred to, and at this extremity of these rods is a milled head, *r′*. Through a screw-threaded aperture in the center of this plate E passes a screw, F, the lower end of which has a socket-bearing in the frame E′. By means of this screw the plate E may be raised or lowered in the frame B″. When it is lowered, the rod *p′*, fastened to the inner part of the outer jaw, *i*, of each pincher, moves down, and the rod *t′*, attached to the outer part, *n*, of the outer jaw, *i*, of each pincher, moves up, and the pinchers thus open. When the plate E is lifted, the inner rods, *p′*, are pulled up, and the jaws *i*, to which they are attached, close.

The operation of this part of my invention is as follows: The lowermost plate, *j*, above described as of the shape of the sole of a shoe, rests upon the bottom of the shoe to be lasted, and it is of such size as to be within the line of the edge of the upper after the latter is drawn over, and thus it does not interfere with the inward movement of the lasting-jaws. The pinchers *i i′* engage with the upper of the shoe to be lasted and pull it up. This is done in the following manner: The screw F, which moves the plate above referred to, is so turned as to push down the plate E. The pinchers thus open, and being so placed as to come in contact with the upper of the shoe to be lasted, they engage with it. The screw F is then turned the other way, the plate E rises with the several rods attached to one jaw, *i*, of the pinchers above described, and the pinchers close upon the upper and hold it firmly. Next the two rods *r* are turned, and as they are turned they raise the bar *k*, with its attachments, except the sole-shaped plate.

The next operation is the gathering in and lateral stretching of the upper over the edges of the last, and I accomplish this by arranging for the heel and toe a pair of geared quadrants, *a a*, which, opening from each other, bring together in proper shape over the heel and toe, respectively, the portions of the upper which in lasting are to be gathered in, and by arranging for the sides of the boot or shoe to be lasted sliding pieces *h h*—one on each side—which, when pushed in toward each other by proper mechanism, force in the portions of the sides of the upper which are to be lapped over the bottom of the boot or shoe which is being lasted. These heel and toe pieces are placed on slides *h′*, which pass over and upon the second frame, B, through spaces left for the purpose, the upper surface of the heel and toe pieces moving upon the under surface of the frame or yoke C and over the inner extremities of the slide *h′*, and passing beyond the ends of the last. These heel and toe pieces are quadrants in form, except that a small portion of the angle of the quadrant is cut away for the purpose of giving these quadrants the proper form at this part to gather in and hold the upper in lasting the toe and heel. In the drawings these quadrants are shown so cut away as to be curved concentrically with the adjacent portions of the frame C. The outer side or periphery of these pieces is geared and adapted to engage with other gearing, whereby in operation they are turned away from each other at their periphery. At the end of their turning the two extremities or inner curved portions of these quadrantal pieces form together an arc something less than a semicircle. (See Fig. 1.) The slides *h′ h′*, upon which these pieces turn, have a reciprocating motion toward and away from the last. Grooves are cut in the slides *h′* upon which the quadrantal pieces *a* turn, and these engage with the curvilinear projection or rib on the under side of the quadrantal pieces near the segmental ends. As thus constructed and arranged, the quadrantal pieces are prevented from being moved vertically or laterally from their proper position, and are confined to the circular motion above described. On the sides, also working beneath the sole-shaped frame C, are side lasting-pieces, *h*, which also pass over the frame B and beneath the yoke C. These side slides, *h h*, when moved forward, push in the sides of the upper over the last. The plane of the four movable pieces—to wit, the heel-quadrants, the toe-quadrants, and the two side pieces by which the drawing in of the leather is in part accomplished—is just over the last. These pieces may be replaced by larger or smaller ones, so as to be adapted to the lasting of boots and shoes of different sizes.

The several parts just described are adapted by suitable mechanism, which will be described below, to move in the following order: The pieces *h′ h′*, to which the quadrants are attached, move forward toward each other until the quadrants come in contact with the upper. When this has been done, the quadrants begin to move and gather in the upper at the heel and toe simultaneously with the still further forward motion of the sliding pieces *h′ h′*—that is, they (the quadrants) are gathering in the upper and moving forward at the same time—and by this motion of turning on a center which is always moving forward over the last in the direction of its longest axis, and which, also, is always a point in the curved face by which the plaiting or lasting is done, I am enabled to do it very successfully. The advantage of having this center of turning always in the curved face by which the lasting is done is that no part of either quadrant passes by the other—or, in other words, that no motion of one blade over another, as in shears, is permitted. Such a shears motion is objectionable, in that it tends to catch or cut the upper between two transversely-moving plates, and thereby mar it, or otherwise injure the perfection of the folding or plaiting. Another advantage is that no gap is left between two blades or plates moving toward each other in the same plane, within which the upper may be caught; but all points of the edges of the two quadrants move in circular paths, and no point has a motion toward another between which motions the upper may be caught, but every point moves in such direction toward the center of the last and of its toe or heel as is required to produce at that point the direction and character of strain upon the leather that characterizes the most perfect hand-lasting.

My construction differs from those formerly used in this respect, among others—viz., that the two plates which form my heel or toe lasting device are not superposed one upon the other, like the blades of scissors or shears, and their pivot is substantially in the line of their curved operating-faces.

The operation of plaiting or gathering in of the upper at the heel and toe and at the sides of the last by means of my appliances secures smoothness and trueness of position of the upper relatively to the last, which is very desirable. The upper having been properly drawn up and the gathering in completed, the jack V, carrying the support D, is now moved up by mechanism hereinafter described, and the turned edge of the upper pressed against the under side of the slides and quadrants, thus holding the upper in place. The motion of the rod F is then reversed, and the plate E, with its attachments, descends, causing the pinchers *i i'* to open and release their hold of the upper. The gripping attachment can then be turned back by means of a hinge connecting it with the frame of the machine. After the upper has been drawn in, as explained, it is to be secured to the inner sole in any proper way. The process of lasting is thus completed.

The mechanism and mode of actuating the various parts which contribute to perform the various operations above described are as follows: There is at the bottom of the machine a screw, T, turned by a wheel, S, to which one extremity of the screw is attached. The other extremity fits into a shaft or jack, V, with cam-shaped sides, of the form shown in the drawings. When the wheel S is revolved one way, the shaft V rises by means of the screw T, and when it is turned the other way it descends.

Around the shaft V, and so placed as to be actuated by its cam-sides, are pieces of metal *w*, hinged at the bottom to the frame of the machine, and adapted to be pushed back by these cam-sides when the shaft V rises. Two of these pieces *w*, placed on opposite sides, have for the face which impinges upon the cam-sides a small roller, 1. These two act upon levers *q*, the ends of which, impinging upon the pieces *w*, just mentioned, are supplied with small rollers 3. As the shaft rises the cam-sided shaft pushes back the hinged pieces, which in turn depress the ends of the levers *q* next to them, and thus the other end is pushed forward against the slides *h*, whose office is to push in the sides of the upper of the shoe to be lasted. The other two pieces placed opposite to each other are similarly constructed, and operate first, as above stated, against similar levers, *q*, which cause to move forward the parts designed to gather in the heel and toe of the shoe to be lasted; but these last levers are also provided with belts, which are fastened at one end to the cam-sided shaft or jack V, and pass thence down and under a small pulley, 5, beneath the upright, to which the pieces on these two sides are hinged, and thence they pass up through the upper part of these pieces in a track provided for them to racks G G, meshing with toothed wheels or gears *g* beneath the frame on which the quadrants for lasting the heel and toe of the shoe are placed. Upon the same shafts with these gears *g* are others, *e*, which ~~engage with and~~ turn the quadrants *a*.

In order to make the parts which gather in the heel and toe of the upper act first and the parts which gather in the sides of the upper act afterward, the cam-sides should not all be on the same horizontal plane; but those two on opposite sides of the shaft or jack V for operating the heel and toe pieces should be on the same level or act at the same time, and those two for operating the side pieces or slides on a lower level, and thus act together a little later. Only two of these cam-sides are illustrated, (see Fig. 3;) but the other two are the same in form and should be at right angles in position to the two shown, and on a slightly-different level, as will be understood by those skilled in the art of constructing lasting-machines. When the cam-shaped shaft reaches the support D on which the last rests, it raises the support, the last and the shoe upon the last pressing the turned edge of the upper against the slide and quadrants, thus holding it firmly in place. The upper is then released from the grip of the pinchers and the auxiliary device is thrown back on its hinge, leaving the edge of the upper exposed, so that it may be permanently secured by nails, pegs, cement, or other practicable means. The extent of the upward travel of the cam-shaft V, and consequently the amount of pressure to secure the turned edge of the upper in place, may be regulated at will by varying the distance to which the screw T is driven into the cam-shaft.

I claim—

1. The combination of the last of a lasting-machine with a pair of lasting plates or quadrants, constructed substantially as described, and adapted to move in the same plane over the leather upon the last in the direction of the longitudinal axis of the last, and to swing, as described, upon a center or pivot situated at about the center of the line of their curved faces which act upon the leather, substantially as described, the whole operating to gather in the leather over and upon the last, substantially as set forth.

2. The combination of the plaiters or quadrants *a a a a*, the toothed wheels *e*, pinions *g g*, the racks G, and sliding plates *h'*, whereby a compound movement of the plaiters is secured by means of suitable operating mechanism, as set forth.

3. The combination of the sliding side plates, *h h*, and the toe and heel plates *h'* with the carriage or jack V, provided with cams, the screw-rod T, uprights *w w*, and levers *q q*, substantially as specified.

4. The combination of the vertically-moving cam-faced carriage or jack V with the hinged uprights *w w* and the levers *q*, whereby the motion of the carriage is caused to impart motion to the lasting-plates with which the said levers are connected, substantially as and for the purpose specified.

5. The combination of the plate E, the screw-rod F, the springs *p* and their adjusting-nuts, the plate *k*, the screw-rods *t* and their adjusting-nuts, and the grippers, substantially as set forth.

6. The combination of the box B″, plate E, screw-rods *r*, plate *k*, and downhold *j*, as set forth.

7. The combination, with the heel, toe, and side lasting devices, and spring-suspended overhanging gripping devices, arranged to grip, pull upward, and swing inward the edges of the upper, and provided with means for opening and closing them, and also with mechanism, substantially as set forth, for moving them to and away from their place of working, of a device for holding down the last against the upward pull of the gripping devices, substantially as set forth.

8. The combination, with the vertically-movable downhold, of the pivoted pinchers held up by spring-supported rods, substantially as described.

9. In a lasting-machine, the movable frame, combined with and carrying the pinchers and downhold, substantially as described.

10. In a lasting-machine, the combination, with the movable frame *k* and its attached pinchers, of screw-rods *r' r'*, adapted to be screwed through the frame, said screw-rods carrying a downhold, *j*, and attached thereto, substantially as and for the purposes hereinbefore set forth.

11. In a lasting-machine, the combination, with the movable frame *k*, of the series of spring-supported pinchers pivotally connected thereto, and the screw-rods *r' r'*, adapted to be screwed through the said frame, said screw-rods carrying the downhold *j*, and attached thereto, all substantially as hereinbefore set forth.

12. In a lasting-machine, the combination, with a series of pinchers, each adapted to swing upon a pivot toward the center of the last, of a series of lasting-slides, each impinging upon the upper below where it is gripped by the pinchers, and swinging the pinchers inward upon said pivot as the leather is forced inward over and upon the last, substantially as and for the purpose herein set forth.

13. In a gripping-device for lasting-machines, the combination of the box or frame B″, the plate E, the screw-rod F, the series of pinchers, the plate *k*, and the downhold *j*, all substantially as described.

14. In a gripping device for lasting-machines, the combination of a box or frame, B″, a plate, E, a screw-rod, F, adjustable springs *p*, and screw-rods *t*, a series of pinchers, a plate, *k*, and a downhold, all substantially as described.

15. In a lasting-machine, the combination of the heel and toe lasting jaws, substantially as described, with the jack V, the levers *q*, and cords, and intervening gearing for opening and closing said jaws.

16. In a lasting-machine, the combination of the vertically-moving block V, having four cam-faces, the four hinged pieces *w w*, operated thereby, four levers operated by said hinged pieces, and the heel, toe, and side lasting devices *a h* operated thereby, as stated.

17. In a lasting-machine, the combination, with heel, toe, and side lasting devices *h h a a*, of the pinchers *i i'*, the downhold *j*, and opening and closing devices for said pinchers, substantially as set forth.

In testimony whereof I have signed my name in presence of two subscribing witnesses.

GILBERT HAWKES.

Witnesses:
JOS. H. ADAMS,
E. PLANTA.